June 7, 1932. H. RAINWATER 1,862,035
LAND CLEARING AND PULVERIZING MACHINE
Filed Sept. 29, 1930 4 Sheets-Sheet 3
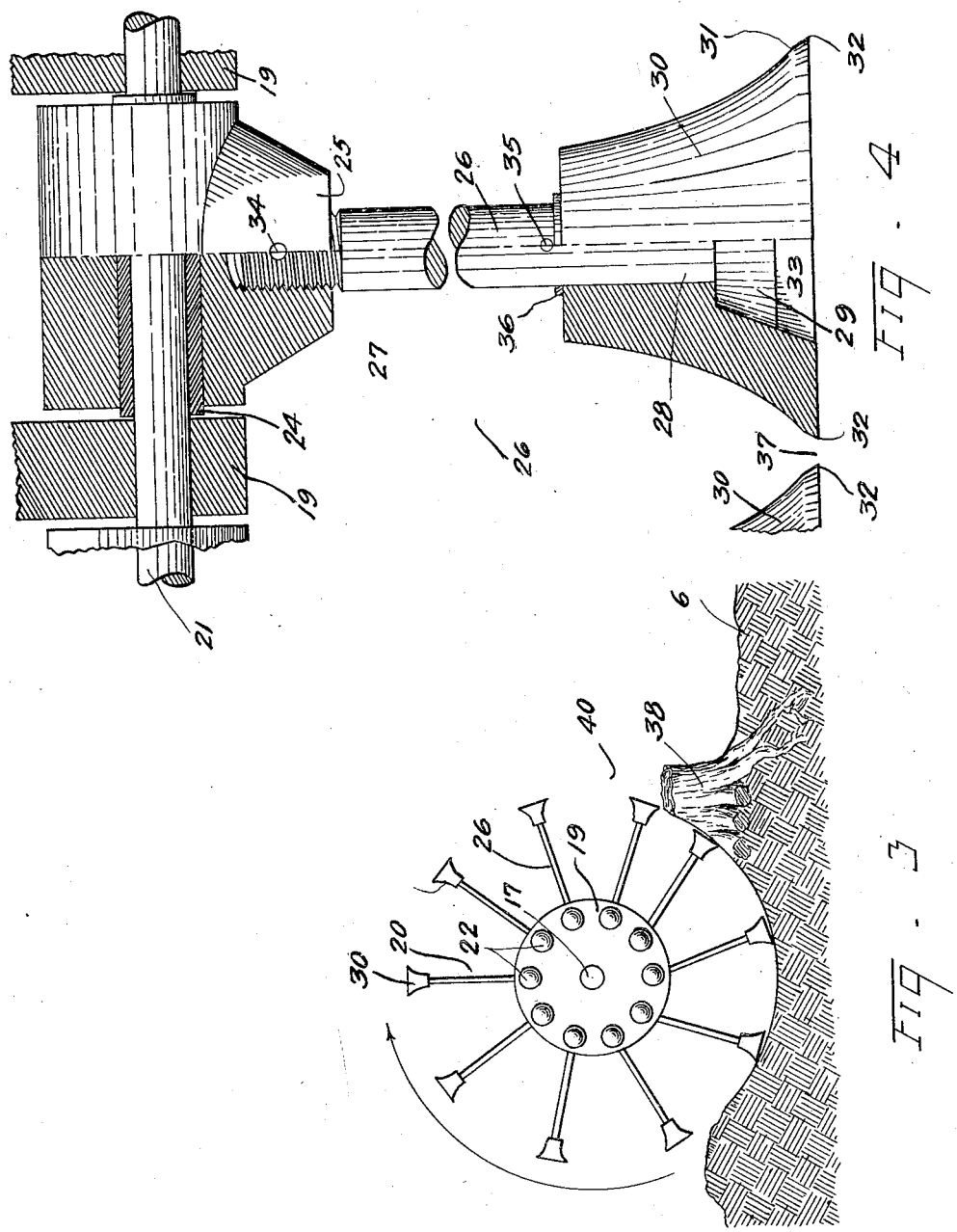
INVENTOR
BY *Harold Rainwater*
ATTORNEY June 7, 1932. H. RAINWATER 1,862,035
LAND CLEARING AND PULVERIZING MACHINE
Filed Sept. 29, 1930  4 Sheets-Sheet 4
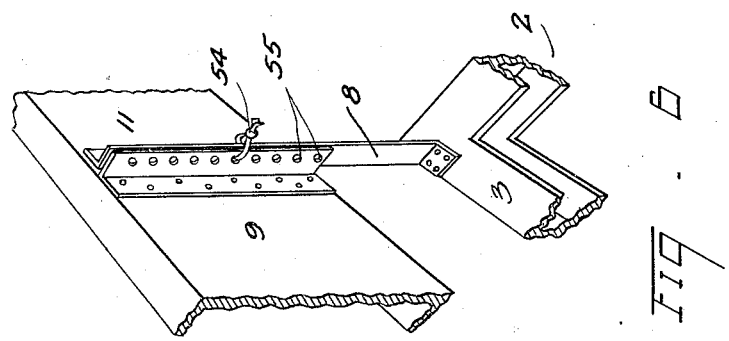
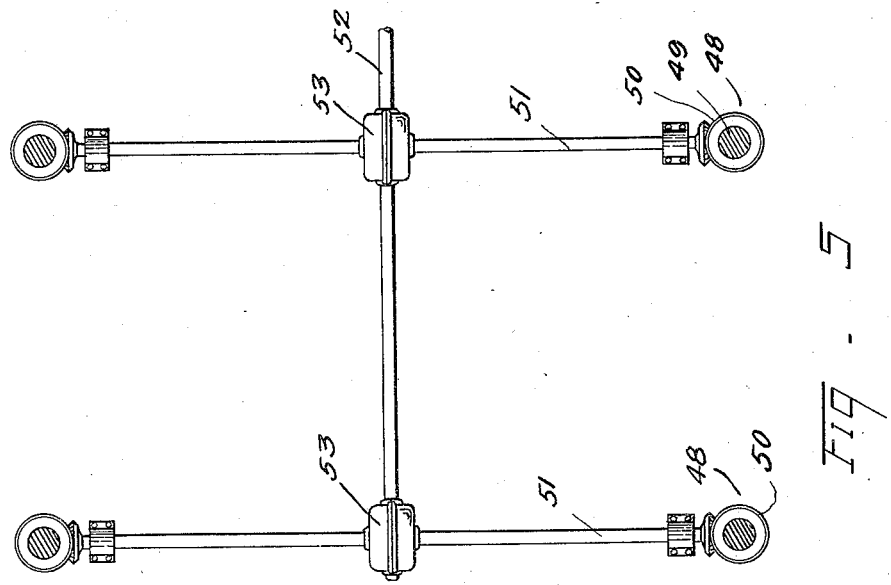
INVENTOR
BY *Harold Rainwater*
*E. E. Sauze* ATTORNEY Patented June 7, 1932

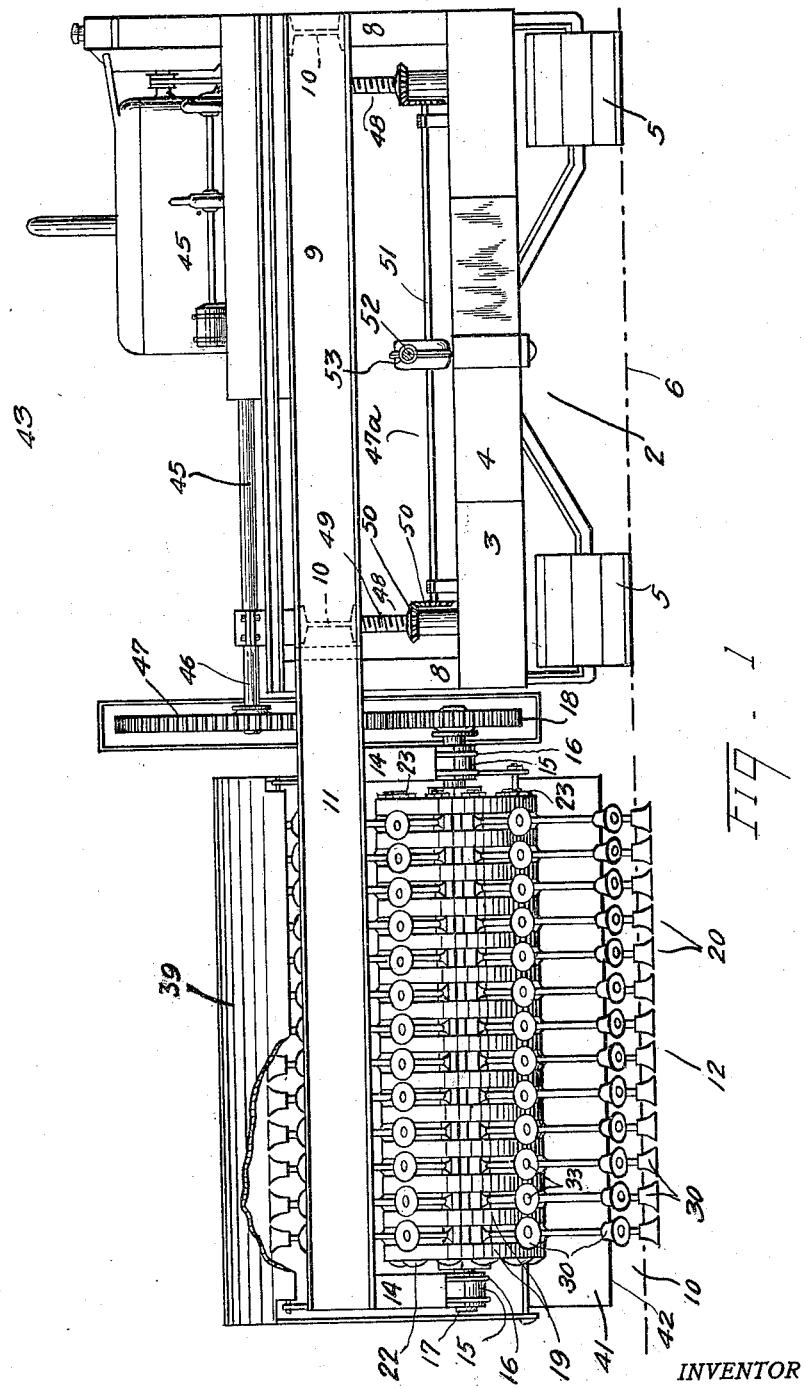

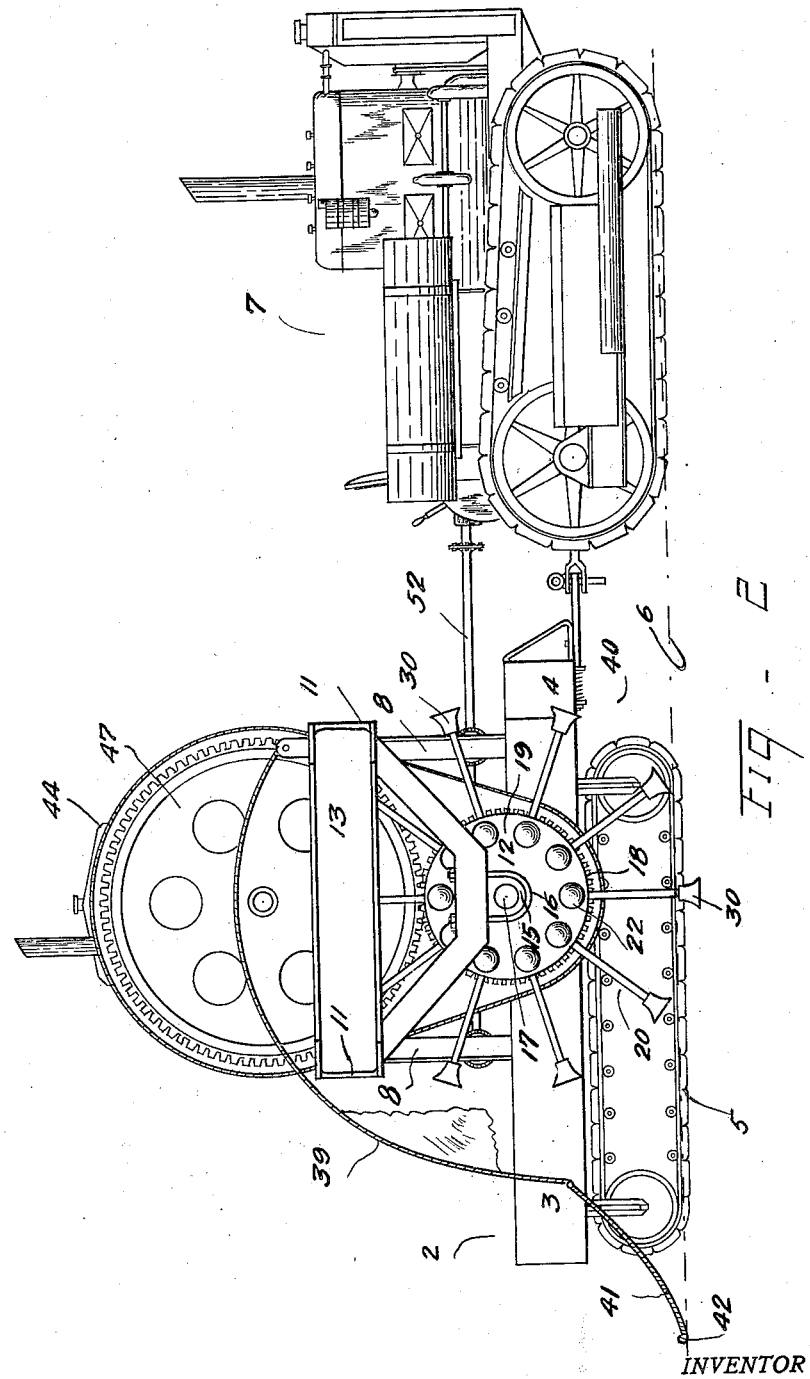

1,862,035

UNITED STATES PATENT OFFICE

HAROLD RAINWATER, OF DAYTON, WASHINGTON

LAND CLEARING AND PULVERIZING MACHINE

Application filed September 29, 1930. Serial No. 485,112.

This invention relates to land clearing machines, and has as one of its objects to provide a land clearing machine that is capable of exceptionally heavy work with a minimum of wear.

Another object of the invention is to provide a land clearing machine that will successfully attack the stumps of stump land (or "logged off land") that is otherwise tillable, and reduce the stumps to provide a wholly tillable land.

A further object of the invention is to provide a land clearing machine that will reduce bowlders to a size to permit tillage of the land.

A further object of the invention is to provide a land clearing machine that will till the soil by pulverization.

A further object of the invention is to provide a land clearing machine that will reduce tillage obstacles to a tillable condition by a succession of recurring blows struck by the sharpened edge of bell shaped hammers.

A further object of the invention is to provide a land clearing machine that will smooth the surface of the prepared land in preparation for planting.

A further object of the invention is to provide a land clearing machine having a regulatable depth of operation adapted for sealing to maintain that depth during operation.

With the above and other objects in view reference is now had to the accompanying drawings in which Fig. 1 is a front elevation of the device shown mounted on a tractor trailer;

Fig. 2 is a side elevation of the device shown as using a tractor as motive power;

Fig. 3 is an end elevation of the rotor of the device shown in a position of operation;

Fig. 4 is an enlarged view of the hammer assembly;

Fig. 5 is a plan view of the depth regulator, or adjusting means; and

Fig. 6 is a perspective view showing the sealing means and its application.

Having reference to the drawings like numerals refer to like parts throughout the several views and the numeral 1 refers to a land clearing and pulverizing machine, and its vehicle supporting structure as a whole, the latter consisting in general of a trailer chassis 2, comprising a frame 3 having on its forward end the usual extended members forming a hitch extension 4 and mounted on tracklayers 5 or other wheel like structures wherewith to travel over uneven ground 6, and the trailer 2, which, as its name implies, is to be drawn over the ground during the operation of the machine, by a tractor 7 or other power means, which power means may include a cable operated by a donkey engine or other suitable means not shown.

Rigidly attached to the frame 3 of the chassis are four vertically positioned posts 8 adapted to form guides for an engine frame 9 which frame consists of suitable cross members 10 shown dotted in Fig. 1 and a supporting frame 11, being an extension of the said engine frame 9, slidably mounted on the said posts, for support in a manner to be explained, and these side members 11 are extended laterally away from the chassis to provide a cantilever structure supported by the said chassis.

The cantilever structure, or supporting frame 11, is extended a distance to accommodate a rotor 12, to be explained, and for the purpose of support this rotor is provided with cross members comprising an end member 13, and a similarly positioned intermediate member not shown, to which is rigidly attached hangers 14 that in turn depend from said frame for the purpose of accommodating hanging bearings 15 secured to these hangers, preferably by means of U bolts 16 or in any suitable manner adapted to such construction.

These bearings 15 receive for rotatable mounting therein the above mentioned rotor, mounted therein by means of a shaft 17 journaled in said bearings to support, with the said hangers and cantilever structure, the said rotor by suspension, and this shaft is extended inward toward the chassis 2 to accommodate a spur pinion 18 which is secured thereon rigidly and for a purpose to be explained.

The rotor 12 comprises a multiplicity of discs 19 mounted on said shaft, in uniform spaced relation, and these discs are rigidly secured to and for rotation with said shaft.

The discs 19 are of relatively substantial construction being provided with considerable thickness, as shown in cross section in Fig. 4, and are spaced apart to receive normally radially extending rotor hammers 20 disposed about the perimeter of the discs of said rotor and include a multiplicity of hammer shafts 21 which extend preferably throughout the length of said rotor, passing though all of the discs 19, and being provided with a head 22 at one end and a nut 23 at the other, or with any suitable means whereby to secure the said discs as a unit on said shaft, thus providing additional unitary securement with such securing means as may directly secure the said discs to the said rotor shaft.

These hammer shafts 21 are provided with spacers 24 mounted thereon and positioned between the said discs to maintain their spaced relation in the well known manner of such construction and assembly, and hingedly mounted on these spacers 24 are bearing heads 25 which form a part of a hinged connection with the hammer shaft, the spacers forming the other part thereof.

Threadedly mounted in each bearing head 25 is an arm 26 preferably consisting of heavy steel shafting or other suitable material of circular form, circular form being preferred as it readily provides for threaded end 27 wherewith to threadedly engage the bearing head 22, and also provides on its outer end 28 for a head 29, preferably of like circular form and integral therewith, whereby to maintain a hammer 30, in the manner shown in Fig. 4, wherein the hammer consists of a bell shaped body whose larger periphery 31 is sharpened to a chisel edge 32 for cutting purposes, and containing a recess 33 in its bottom part, also of circular form, to rotatably seat the said circular head 29 of this arm 26.

The threaded connection of the arm with the bearing head is prevented from loosening by a pin 34, or other means such as a set screw, not shown, and to prevent the hammer 30 from dropping away from the head 29 of the arm 26, when in upwardly extending position from said rotor, a pin 35 and washer 36 is provided as shown which maintains the hammer 30 in its true position on the said arm without interference with the rotation of said hammer thereon during operation.

The assembly and dimensions of the radially extending hammers are such that a slight space 37 is provided between the cutting edges 32 of adjacent hammer heads, as shown in Fig. 4, by which spacing of the hammers the cutting edges 32 cannot interfere with each other to their detriment, and the spacing is sufficiently small to prevent the passage of material that might obstruct the tillage of the ground.

While a certain number of rotor hammers 20 are shown herein it is obvious that a greater or less number thereof may be utilized if found desirable, and where it is desired to change the size and weight of the said hammer head, a heavy hammer could be used requiring less length of arm normally than would a lighter hammer by changing the arm to that of required length.

By the above construction it is obvious that each cutting edge 32 may be readily sharpened, and as each hammer is loose on its arm, and as it is also loose on its hinge, the said head may be moved out of the plane of its fellows there to be sharpened without removal from the rotor, or if deemed advisable the pin 34 may be removed and the arm unscrewed from the bearing head 25 for grinding, or the hammer may be removed from the thus free arm, by driving out the pin 35, which last operation would permit removal and the substitution of a new head if required.

It is now apparent that if a high velocity is attained by the rotor that the said discs 19 will act as fly wheels and that the centrifugal force will maintain the hammer arms extended radially, with a slight deviation from the radial line occurring upon coming in contact with tillage obstacles, such as a stump 38, in the manner as shown in Fig. 3, wherein the successive occurrence of striking such a stump, or even bowlders, not shown, would disintegrate these obstacles, and by regulating its depth of cut would pulverze the soil 6 at the same time and provide a seed bed as well as a tillable ground in one operation over the surface of the ground over which it travels and in the range of said hammers.

To protect the operator a substantial shield 39, as shown in Figs. 1 and 2, is secured to the frame 11 in a manner to cover the rotor 12 on its top and on its back or rearward side, which shield, with the front side member of the supporting frame, will provide an exposed working face 40 approximating 120 degrees of the complete circle of operation, whereby the rotor may attack any stump or bowlder of any size less than that of the height of said supporting frame 11, and this protecting shield is of generally circular form so that matter thrown up against the shield in the course of operation will be directed to fall to the ground back of the hammers, at which place a smoothing apron 41 is provided hingedly attached to the shield, with one edge 42 in contact with the ground and positioned to follow the rotor to level the pulverized and disintegrated conglomerate.

To operate the said rotor an operating means 43 is provided which consists preferably of an engine 44 mounted on the engine frame 9 and this engine is disposed thereon to provide a counterweight that will counterbalance the cantilever frame 11, and the rotor 12 suspended therefrom, and the engine is provided with a drive shaft 45 parallelling the engine frame 9 and this shaft is provided on its end 46 with a spur gear 47 adapted to engage the beforementioned spur pinion 18 mounted on the said rotor shaft 17, thereby to provide for the high velocity of the rotor by the selected diametral dimensions, or pitch, of the said spur gear and spur pinion.

Obviously a clutch and flexible coupling may be provided on the drive shaft if desired and as usual in such assembly, although these parts are not shown as they do not enter into the invention and are old in the art.

As before mentioned the engine frame 9 is slidably mounted on said posts 8, which posts form guide posts therefor, and the frame 9 is supported by an adjusting means 42—a consisting of four jacks 48 disposed with two of the jacks under each frame member, which jacks consist of the usual worms 49, and bevel gears 50 engaging the worms, with cross connecting shafts 51 connecting opposite pairs of jacks and with a main operating shaft 52 connecting with the cross shafts where, by means of a worm wheel and gear connection, represented as at 53, both of said cross connecting shafts may be operated simultaneously, either manually or by power from the said tractor as shown, in Fig. 2, or by suitable connection with the driving engine, not shown.

By operation of this adjusting means the rotor may be raised or lowered by the raising or lowering of the cantilever supporting frame, to a predetermined cutting depth with respect to the land thus providing a depth gage adapted for the purpose.

Where it is desired to operate under contract and a certain depth of operation is specified the rotor may be positioned to the specified cutting depth when a seal 54 may be placed as shown in Fig. 6, and engaging holes 55 for the purpose are provided in the said guide posts and the sliding members therefor to provide assurance of maintaining the depth of cut of said rotor.

In use the device is intended to bring the pulverizing rotor into contact with the tillage obstacles where found and, by disintegrating the material of the obstacles, render the ground free thereof.

While this work may be carried on systematically, to cover the entire surface of the ground, it may also be carried to each obstacle directly, and the tillage then completed with other cultivating implements.

For this purpose the hammers of the rotor will pulverize the ground, as well as disintegrate the obstacles that would ordinarily prevent a complete tillage of the soil, and the whole device may be adjusted vertically that the obstacles may be reduced to a depth equalling the action in the soil, whence, a plow or other like implement may be subsequently used to complete the work if desired.

With the device adjusted to the desired depth of cut the engine is started and the rotor, driven by the engine, will start its high speed revolutions, and under the centrifugal force produced by this high speed the hammers will assume a radial position in which position they will attack the soil or the obstacles with recurring blows that will reduce the obstacles and the original soil condition to a condition conducive to tillage, the hammer heads being provided with a sharp edge around the periphery of their rim for the purpose.

During this operation the discs of the rotor will act as flywheels to aid in maintaining a constant velocity to the rotor. The recurring blows of the hammers, struck in rapid succession, will rapidly wear down a stump, even to its roots, by removing small parts at each blow, within the range of operation of the machine, in other words, its working face.

Where bowlders are encountered they will be attacked in the same manner, viz. by advancing upon them, and while it is recognized that the rotor is of similar construction to that of a rotor in a hammer rock crusher, the rotor described is conspicuous by the total absence of crushing plates and by being provided with the working face extending from the horizontal surface of the ground to the vertical obstacles, and for the reason that the work contemplated by this machine requires no crushing plate, the rigidity of the standing stump and the security of the bowlder backed by the soil rendering the plates superfluous.

And further, and more particularly, as the prime object is to reduce the obstacle to a size that will not obstruct the tilling operation.

During operation the device may be drawn from one side of the field to the other by a cable attached to the trailer and operated by suitable power, and by previously adjusting the depth of cut may be unattended in its movement over the ground.

As before described other means of propulsion may be used and in any case the hammers will pulverize the soil over which the device is drawn and will disintegrate the obstacles as they are encountered.

This action of the device will throw the small removed parts of the obstacle back against the guard, and from thence to the ground, to be smoothed out by the apron, which will render the soil ready for planting.

Obviously a chain or other driving means may be used in place of the spur gears as when it is desired to change the rotor to the opposite side of the chassis, so that the rotor will turn in the direction of the arrow in either case.

Having thus described my invention, I claim:

1. In a land clearing and pulverizing machine, the combination of a vehicle structure, an engine frame mounted thereon and extended to provide a cantilever structure, a high speed rotor rotatably supported by said cantilever structure and provided with a multiplicity of laterally adjacent and normally radially extending hammers, hingedly attached to said rotor, and depending upon centrifugal force by the speed of the rotor to maintain the radial position thereof, an operating means carried on said engine frame and disposed with said frame to counterbalance said rotor on said vehicle structure, means operatively connecting said rotor and said operating means, and means mounted on said vehicle structure to vertically adjust said rotor.

2. In a land clearing and pulverizing machine, in combination with a vehicle structure, an engine frame mounted on said structure and extended to provide a cantilever supporting frame, a pulverizing rotor adjustably supported by said frame and comprising a rotatable shaft provided with a spur pinion, discs rigidly secured to said shaft in uniformly spaced relation, and radially extending hammers rigidly mounted between said discs and adapted to engage and disintegrate tillage obstacles encountered in its path, a protecting shield secured to said frame and provided with a smoothing apron hingedly attached thereto and disposed to follow said rotor to, level the pulverized and disintegrated material, and operating means mounted on said engine frame and adapted with said structure to counterbalance said rotor, an adjusting means mounted on said vehicle structure and disposed to vertically adjust said engine frame, and said rotor, to a predetermined cutting depth with respect to the land and means to assure the maintenance of the cutting depth.

3. In a land clearing and pulverizing machine, in combination with a vehicle structure, a supporting frame mounted thereon and extended to provide a cantilever supporting frame, a pulverizing rotor adjustably suspended from said frame and comprising a rotatably mounted shaft provided with a spur pinion, discs rigidly secured to and rotatable with said shaft and adapted to act as fly wheels thereon, radially extending hammers hingedly mounted between said discs and comprising a bearing forming a part of said hinge and projected radially to provide arms and removable hammer heads attached to said arms, each of said hammer heads being provided with a cutting edge adapted to engage and disintegrate tillage obstacles encountered in the range of said hammers, and to pulverize said ground, a protecting shield secured to said frame, a smoothing apron hingedly attached thereto and disposed to follow said rotor, a power operating means mounted on said structure, and disposed for operable connection with said rotor and to vertically adjust said engine frame, and said rotor, to a predetermined cutting depth with respect to the land, and means to seal said adjustment to assure a constant maintenance of the depth of cut.

In testimony whereof I affix my signature.

HAROLD RAINWATER.